(12) United States Patent
Affentranger, Jr.

(10) Patent No.: US 11,695,369 B1
(45) Date of Patent: Jul. 4, 2023

(54) SURFACE MOUNT ASSEMBLIES FOR A SOLAR PANEL SYSTEM

(71) Applicant: Sunrun Inc., San Francisco, CA (US)

(72) Inventor: Martin John Affentranger, Jr., Paso Robles, CA (US)

(73) Assignee: Sunrun Inc., San Francisco, CA (US)

( * ) Notice: Subject to any disclaimer, the term of this patent is extended or adjusted under 35 U.S.C. 154(b) by 0 days.

(21) Appl. No.: 17/947,057

(22) Filed: Sep. 16, 2022

(51) Int. Cl.
| | |
|---|---|
| *H02S 20/23* | (2014.01) |
| *F24S 25/61* | (2018.01) |
| *F16B 19/00* | (2006.01) |
| *H02S 30/00* | (2014.01) |
| *F24S 25/10* | (2018.01) |
| *F24S 25/60* | (2018.01) |
| *F24S 25/00* | (2018.01) |

(52) U.S. Cl.
CPC ............ *H02S 20/23* (2014.12); *F16B 19/008* (2013.01); *F24S 25/10* (2018.05); *F24S 25/61* (2018.05); *H02S 30/00* (2013.01); *F24S 2025/021* (2018.05); *F24S 2025/6005* (2018.05); *Y02E 10/47* (2013.01)

(58) Field of Classification Search
CPC ...... F24S 25/10; F24S 25/61; F24S 2025/021; F24S 2025/6005; H02S 20/23; H02S 30/00; Y02E 10/47
See application file for complete search history.

(56) References Cited

U.S. PATENT DOCUMENTS

| | | | | |
|---|---|---|---|---|
| 4,408,940 A | * | 10/1983 | Fischer | E04B 1/4164 411/401 |
| 6,141,928 A | * | 11/2000 | Platt | E04F 11/1814 52/832 |
| 6,240,689 B1 | * | 6/2001 | Haddad | E04H 12/2261 248/74.1 |
| 7,553,103 B2 | * | 6/2009 | Jameson | E01F 9/608 40/607.01 |
| 8,235,348 B1 | * | 8/2012 | Curtis | E01F 9/629 248/548 |
| 8,448,407 B1 | * | 5/2013 | Wiener | F16B 43/001 52/173.3 |
| 8,714,511 B2 | * | 5/2014 | Zoeteman | A45B 11/00 248/537 |
| 9,238,922 B2 | * | 1/2016 | Intagliata | E04H 12/347 |
| 9,874,024 B2 | * | 1/2018 | Green | E04F 11/1846 |
| 9,976,298 B2 | * | 5/2018 | Bergman | E04H 17/22 |

(Continued)

*Primary Examiner* — Jessie T Fonseca
(74) *Attorney, Agent, or Firm* — Kramer Levin Naftalis & Frankel LLP

(57) ABSTRACT

Surface mount assembly for mounting to a solar panel frame to an installation surface is disclosed. In some embodiments, a surface mount assembly includes a base and an enclosure. The base includes a lower member and an upper member. The lower member could include a brace, a center aperture extending through the lower and upper members for receiving a fastener to facilitate the mounting to a solar panel frame; the upper member could include a hub from which a plurality of arms may extend. The mount enclosure could include a chamber with a chamber aperture for receiving a fastener from the surface mount, a post support extending upward from the chamber and forming a post aperture for receiving a post, and a horizontal member with one or more sealant grooves extending horizontal outward from the chamber.

14 Claims, 15 Drawing Sheets

(56) References Cited

U.S. PATENT DOCUMENTS

| | | | | |
|---|---|---|---|---|
| 10,767,684 | B1* | 9/2020 | Meine | F16B 37/14 |
| 2011/0303807 | A1* | 12/2011 | Van Walraven | E04D 13/12 |
| | | | | 248/346.06 |
| 2012/0233958 | A1* | 9/2012 | Stearns | H01Q 1/1221 |
| | | | | 52/708 |
| 2013/0009025 | A1* | 1/2013 | Stearns | G09F 7/18 |
| | | | | 248/237 |
| 2013/0074441 | A1* | 3/2013 | Stearns | E04D 13/10 |
| | | | | 52/705 |
| 2013/0091787 | A1* | 4/2013 | Puga | F24S 25/61 |
| | | | | 52/173.3 |
| 2013/0298494 | A1* | 11/2013 | Corsi | F24S 25/61 |
| | | | | 52/705 |
| 2013/0320161 | A1* | 12/2013 | Merhar | F16M 11/00 |
| | | | | 248/121 |
| 2014/0331594 | A1* | 11/2014 | Stearns | F16B 43/001 |
| | | | | 52/705 |
| 2016/0040431 | A1* | 2/2016 | Stanley | F24S 25/61 |
| | | | | 52/741.4 |
| 2016/0248368 | A1* | 8/2016 | Seery | F24S 25/61 |
| 2016/0248369 | A1* | 8/2016 | Almy | F24S 25/61 |
| 2016/0268957 | A1* | 9/2016 | Liptak | E04D 12/002 |
| 2017/0279403 | A1* | 9/2017 | Seery | H02S 20/23 |
| 2018/0167023 | A1* | 6/2018 | Meine | H02S 20/23 |
| 2020/0096155 | A1* | 3/2020 | Georgeau | F16L 3/02 |
| 2020/0248457 | A1* | 8/2020 | Shadwell | F16M 13/02 |
| 2020/0400272 | A1* | 12/2020 | Patton | E04D 13/00 |
| 2022/0034093 | A1* | 2/2022 | Shadwell | H02S 20/24 |
| 2022/0099136 | A1* | 3/2022 | Meine | E04D 15/04 |
| 2022/0228704 | A1* | 7/2022 | Sargent | A62B 35/0068 |

* cited by examiner

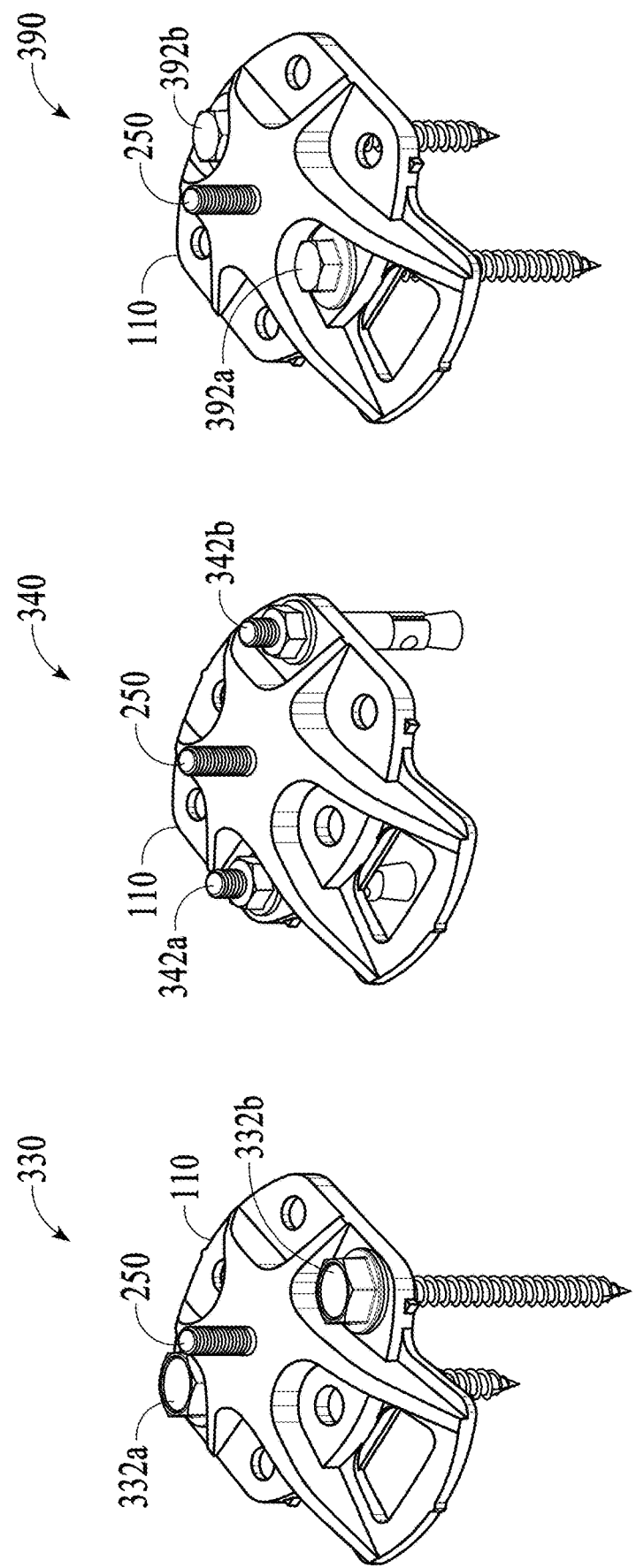

US 11,695,369 B1

SURFACE MOUNT ASSEMBLIES FOR A SOLAR PANEL SYSTEM

TECHNICAL FIELD

The present invention relates to solar panel systems, and in particular, to mounting assemblies installed to installation surface of a solar panel system.

BACKGROUND

Building-mounted structures are typically secured to a building surface with one or more mounting assemblies. Each assembly may include multiple components which, when coupled together, facilitate the ability to mount solar components above an installation surface to which solar panel modules may be mounted during the installation of systems designed to generate solar power.

When mounts are coupled to an installation surface, multiple fasteners may be employed to couple one mount. When multiple mounts are used to mount multiple components, the amount of time and man-power necessary are not insignificant. Moreover, many mounts are exposed to the environment and susceptible to foreign contamination such as water incursion. Although one or more types of flashings may be mounted on the installation surface with the mount to prevent water incursion, these are separate components, thereby consuming the amount of time and man-power needed when installing components of a solar power generation system.

SUMMARY

Embodiments of the inventive concepts disclosed herein are directed to a surface mount needing only one fastener to be coupled to the installation surface and only one fastener needed to mount a surface mount enclosure, where the surface mount and surface mount enclosure may facilitate a solar module frame of a solar module or an array of solar modules to be suspended above the installation surface.

In one aspect, embodiments of the inventive concepts disclosed herein are directed to a surface mount for mounting to a solar panel frame to an installation surface. The mount could include a base having a lower member and an upper member. The lower member could include a brace, a center aperture extending through the lower and upper members for receiving a fastener to facilitate the mounting a surface mount enclosure. The upper member could include a hub from which a plurality of arms may extend.

In a further aspect, embodiments of the inventive concepts disclosed herein are directed to a surface mount enclosure for mounting to a solar panel frame to an installation surface. The mount enclosure could include a chamber with a chamber aperture for receiving a fastener from the surface mount, a post support extending upward from the chamber and forming a post aperture for receiving a post, and a horizontal member with one or more sealant grooves extending horizontal outward from the chamber. The chamber aperture may be configured to align with a base aperture of a base and receive a distal end of a fastener extending upwardly through the base aperture.

In a further aspect, embodiments of the inventive concepts disclosed herein are directed to a surface mount assembly comprised of the base of the surface mount assembly coupled to the surface mount enclosure, where the post received in the post enclosure engages the fastener extending through the base and chamber aperture. After the base is mounted to the installation surface, the brace of the base engages the installation surface. In some embodiments, the presence of the base facilitates the mounting of the base with one fastener only. Thereafter, upon the engagement of the post with the fastener and the tightening of the post, an upper surface of the hub of the base is drawn towards an inner surface of the chamber until both surfaces engage one another as the surface mount enclosure engages the installation surface.

BRIEF DESCRIPTION OF THE DRAWINGS

For a fuller understanding of the inventive embodiments, reference is made to the following description taken in connection with the accompanying drawings in which:

FIGS. 3A through 3I, inclusive, illustrate various fastener configurations that may be employed when mounting the base to the installation surface, in accordance with some embodiments.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

Figure 1A:
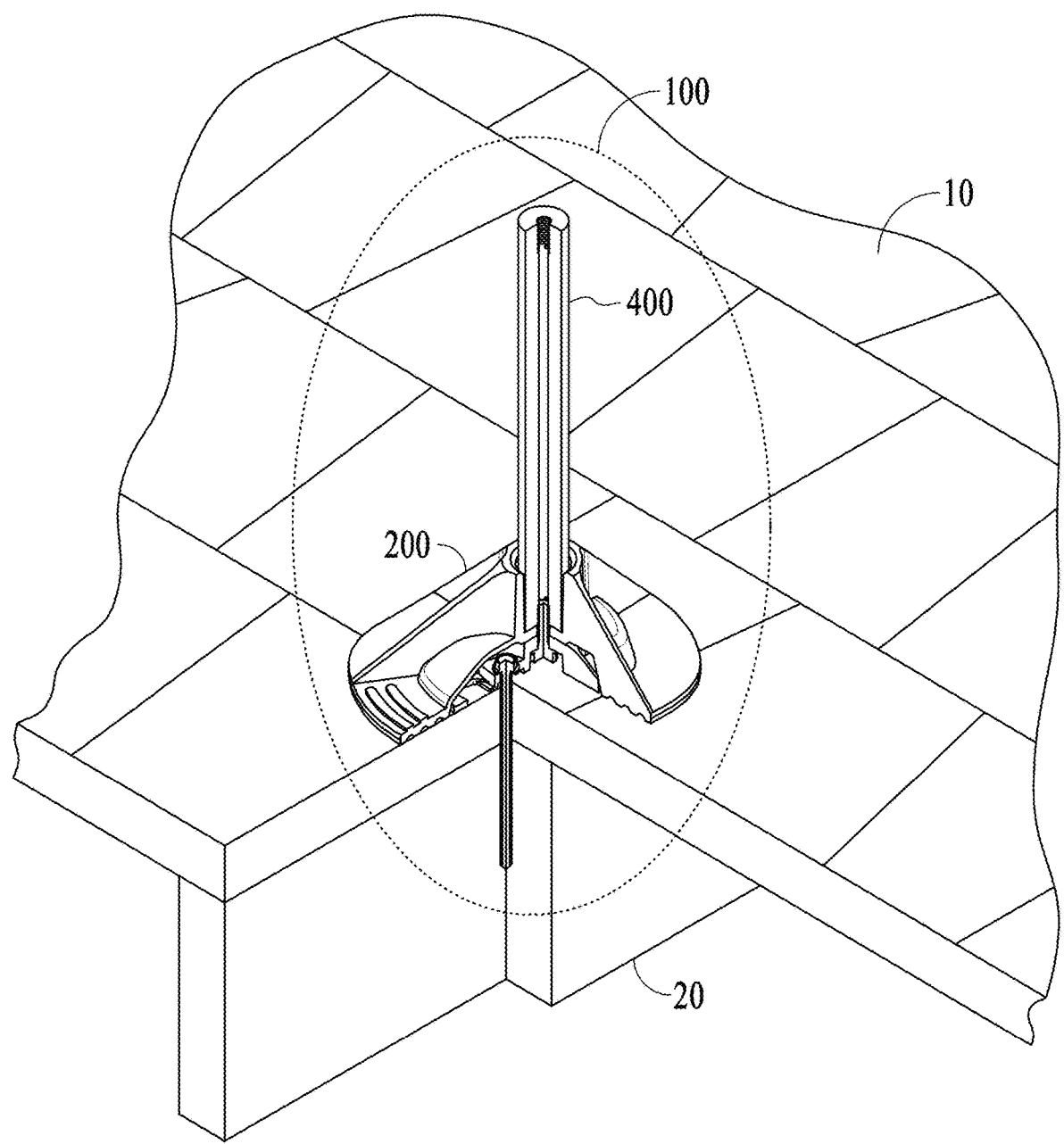
FIG. 1A illustrates a mount assembly installed or mounted on an installation surface, in accordance with some embodiments.
Figure 1B:
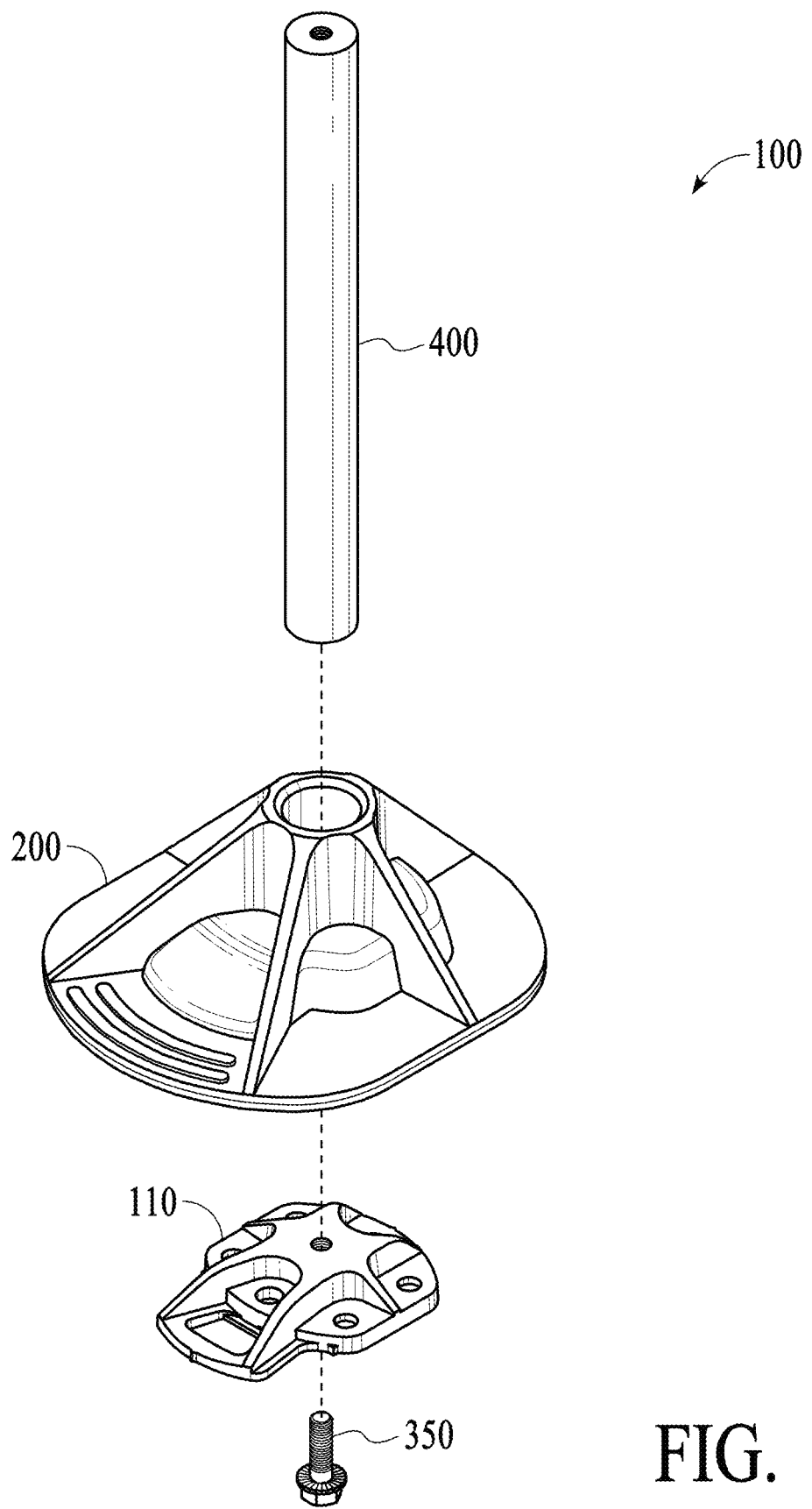
FIG. 1B illustrates an exploded view of the mount assembly, in accordance with some embodiments.
Figure 1C:
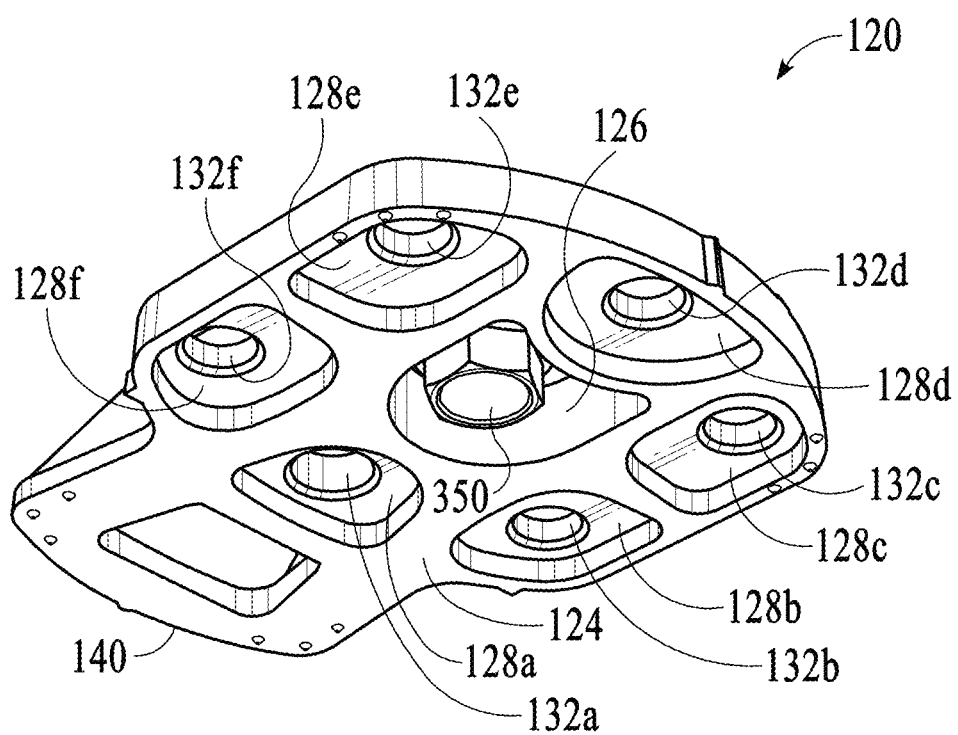
FIGS. 1C and 1D illustrate isometric and orthogonal bottom views of a base of the mount assembly; in accordance with some embodiments.
Figure 1D:
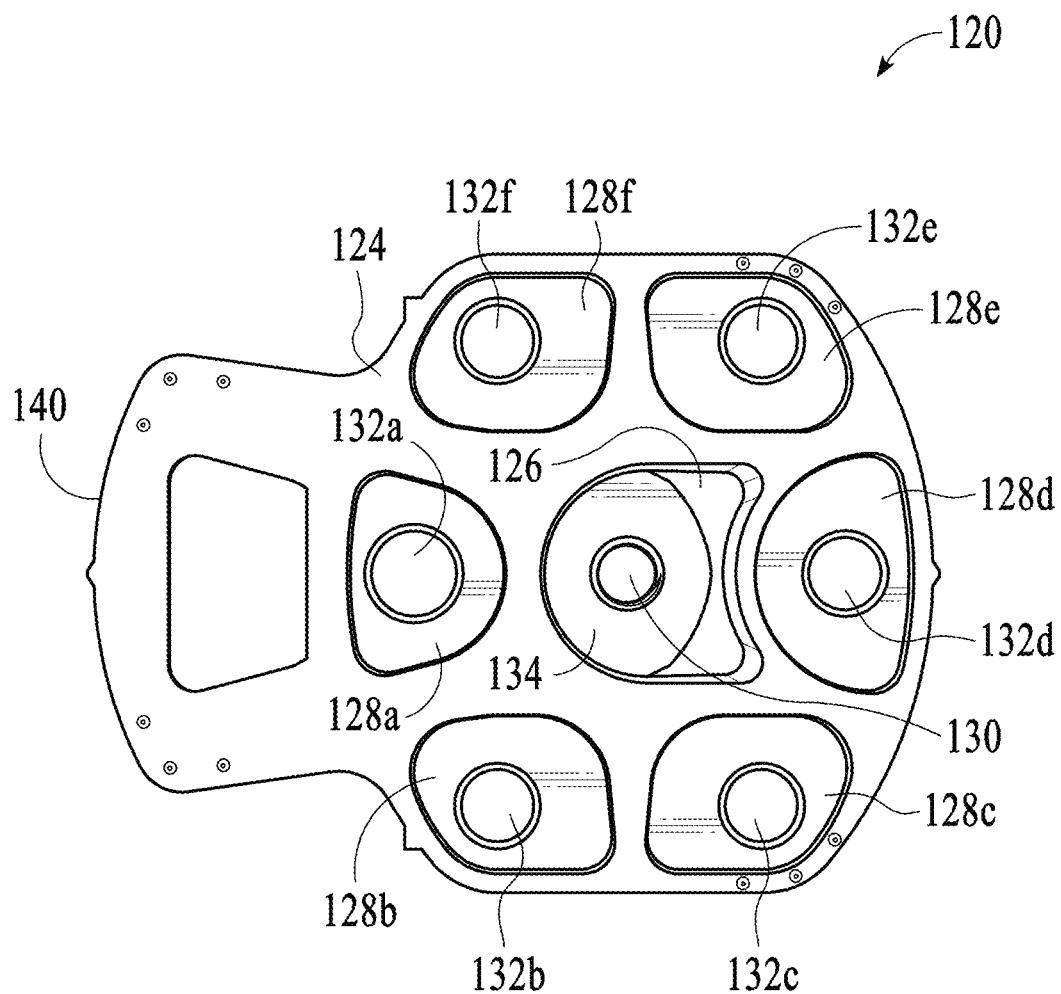
Figure 1E:
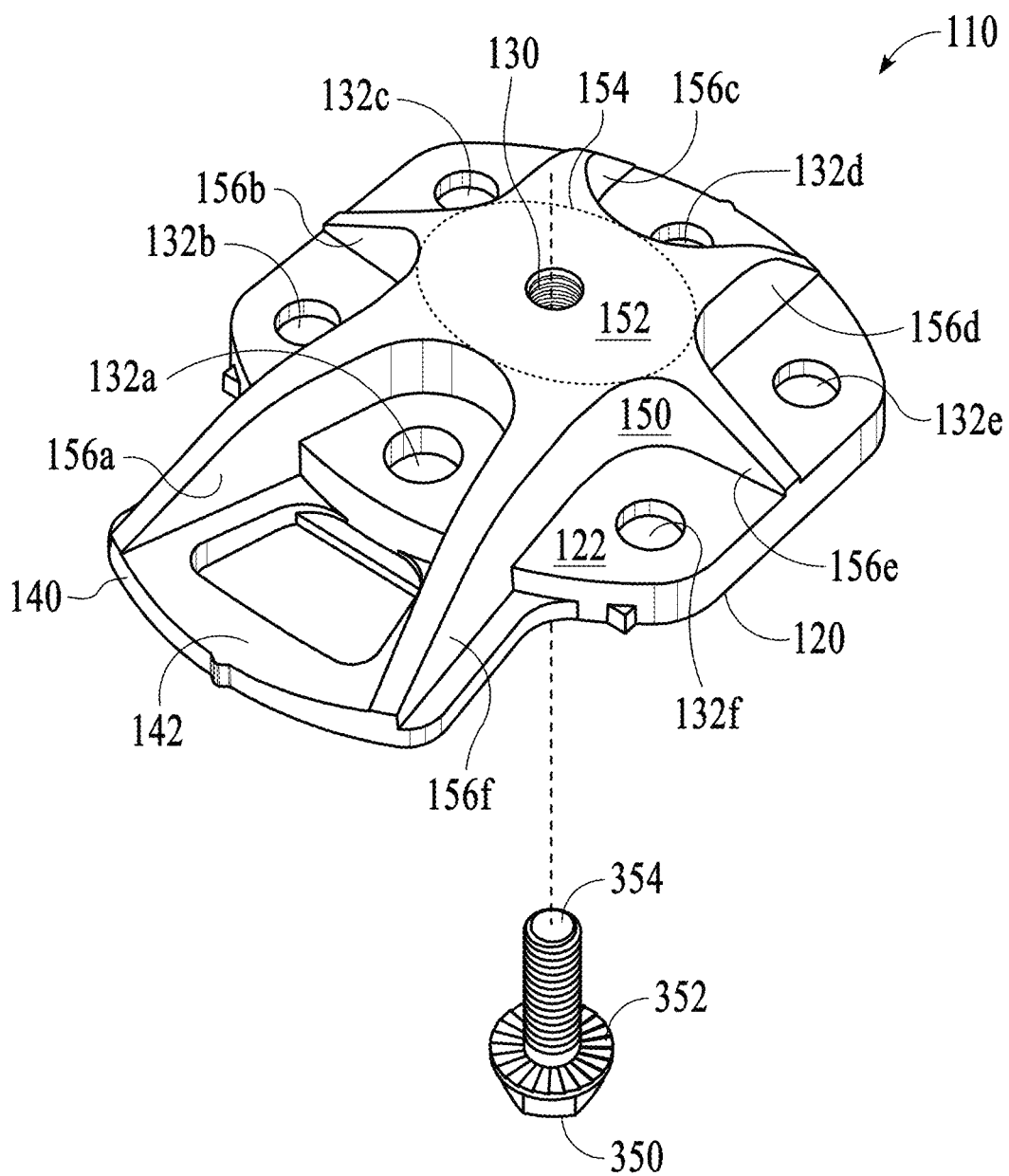
FIGS. 1E and 1F illustrate isometric and orthogonal top views of the base, respectively, in accordance with some embodiments.
Figure 1F:
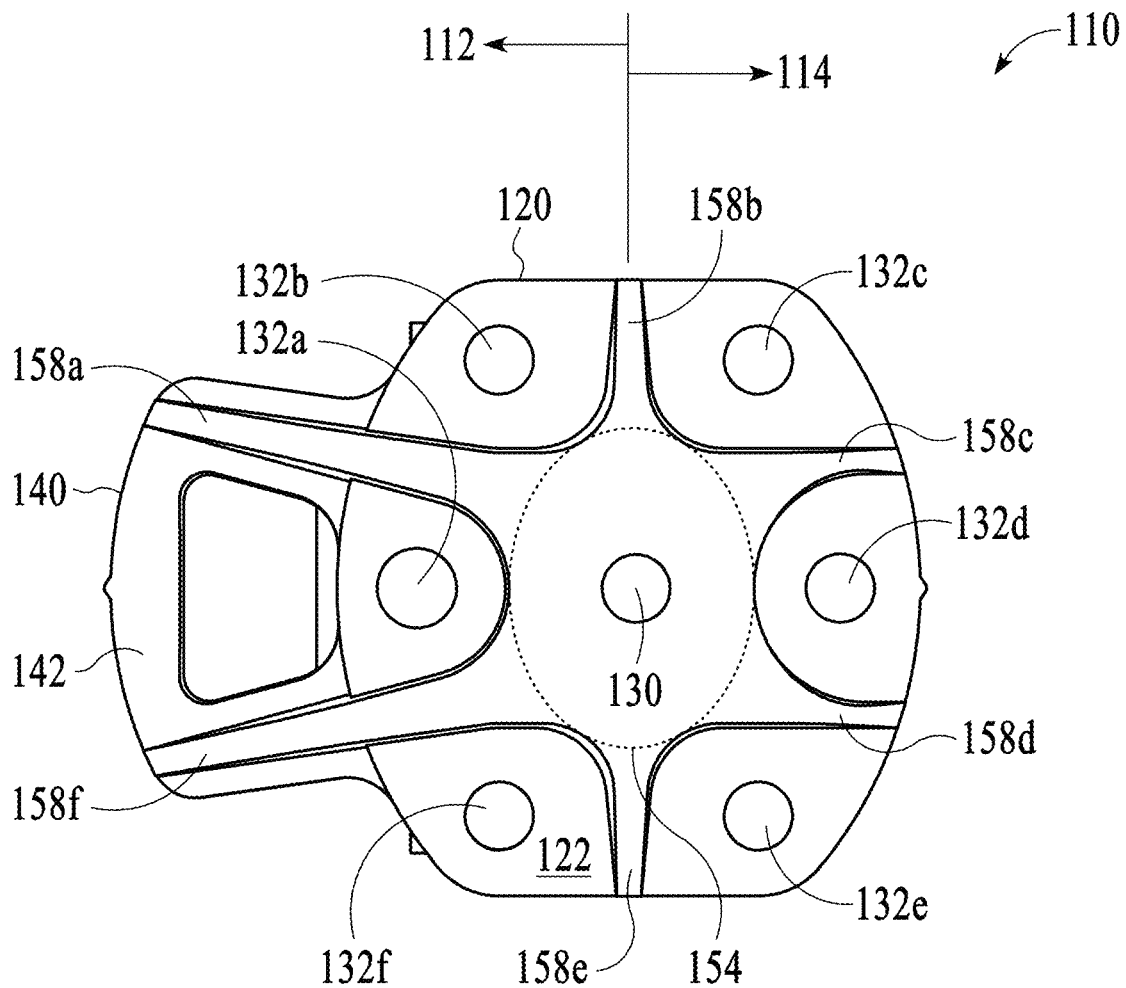
Figure 1G:
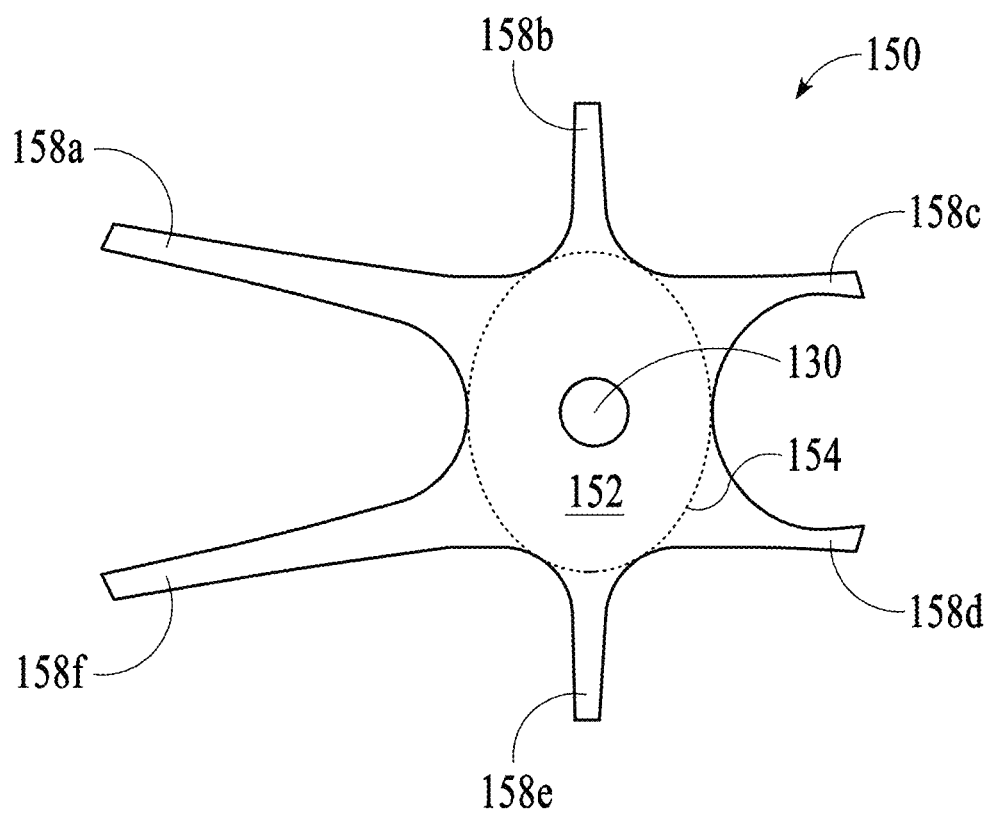
FIG. 1G illustrates orthogonal top view of an upper member of the base, in accordance with some embodiments.

FIG. 1A illustrates mount assembly 100 installed or mounted on an installation surface 10 such as a roof and underlying support structure 20. FIG. 1B illustrates an exploded view of mount assembly 100 including a base 110, an enclosure 200, and fastening hardware of a fastener 350 and post 400 for coupling base 110 to enclosure 200. FIGS. 1C and 1D illustrate isometric and orthogonal bottom views of base 110, respectively; FIGS. 1E and 1F illustrate isometric and orthogonal top views of base 110, respectively; and FIG. 1G illustrates a top view of base upper member 150.

Base 110 may be divided into forward and aft portions 112 and 114, respectively, and comprised of a lower member 120 and an upper member 150. In some embodiments, lower member 120 and upper member 150 are integral with one another. Lower member 120 may include an upper surface 122 and a lower surface 124. In some embodiments, lower surface 124 could include a center cavity 126. In some embodiments, lower surface 124 could include a plurality of cavities 128a through 128f, inclusive.

Base 110 includes an aperture 130 extending between an upper surface 152 of upper member 150 and cavity 126, and a plurality of apertures 132a through 132f, extending between upper surface 122 and cavities 128a through 128f, respectively. In some embodiments, sealant could be applied to cavity 126 and cavities 128a through 128f prior to base 110 being mounted to installation surface 10 to prevent moisture incursion. Aperture 130 may be threaded to receive complementary threads of fastener 350 extending upwardly from cavity 126 prior to base 110 being mounted to installation surface 10 until lower surface 352 of fastener 350 engages a flat upper surface 134 of cavity 126 and distal end 354 of fastener 350 completes its travel through aperture 130.

Although the preceding discussion includes cavity 126 and aperture 130 that is threaded, the embodiments herein are not limited to these. For example, a flush fastener, such as but not limited to a persert flush fastener, may be pressed against lower surface 124 and inserted or pressed into aperture 130 such that a distal end of the flush fastener extends beyond upper surface 152 of upper member 150 and a portion 220 of outer surface 218 of chamber 250 to engage post 400 as discussed below.

Forward portion 112 of lower member 120 includes a brace 140 extending outwardly from lower member 120. In some embodiments, brace 140 will enable the ability for an installer to mount base 110 to installation surface 10 using one fastener only inserted into aperture 132a as discussed below for FIGS. 3A through 3C, inclusive. When installed, brace 140 prevents base 110 from tilting forward after mount assembly 100 is mounted to installation surface 10. Should any structure mounted to post 400 experience external forces imparted by external environmental conditions, resulting forces imparted to base 110 in the forward direction arising from these external forces could cause base 110 to tilt forward but for the presence of brace 140.

Upper member 150 may include upper surface 152 having a hub 154 that includes aperture 130 and from which a plurality of arms 156a through 156f, inclusive. Upper surface 152 may include upper surfaces 158a through 158f, respectively, extend outwardly and downwardly from hub 154 until upper surfaces 156a and 156f reach the edge of upper surface 144 of brace 142, as shown, and upper surfaces 158b through 158e reach the of upper surface 122 of lower member 120, as shown. As observed, the individual extended lengths of arms 156a and 156f extending from hub 152 are greater the individual extended lengths of arms 156b through 156e, inclusive.

Figure 2A:
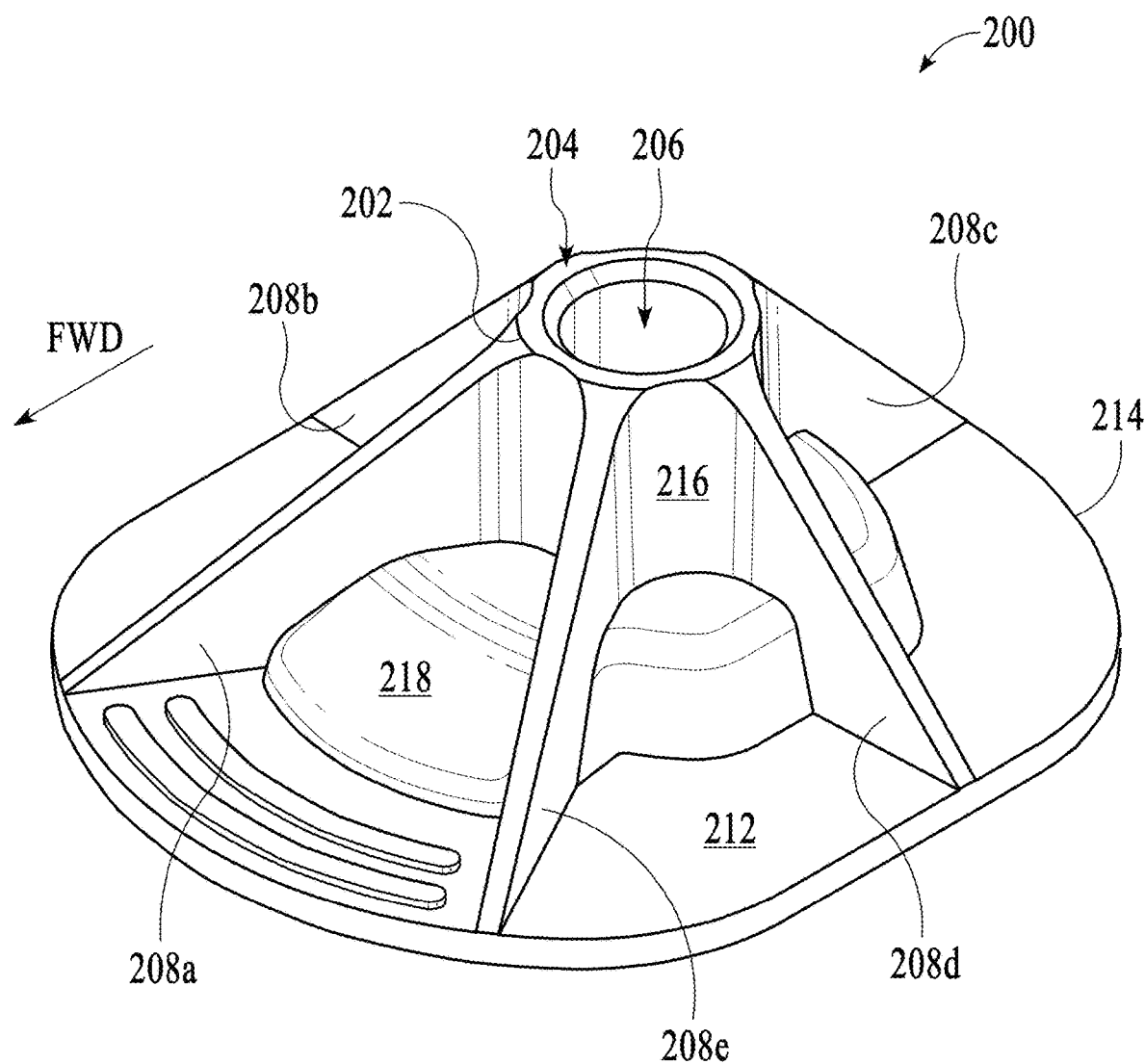
FIGS. 2A and 2B illustrate isometric and orthogonal top views of an enclosure of the mount assembly, respectively, in accordance with some embodiments.
Figure 2B:
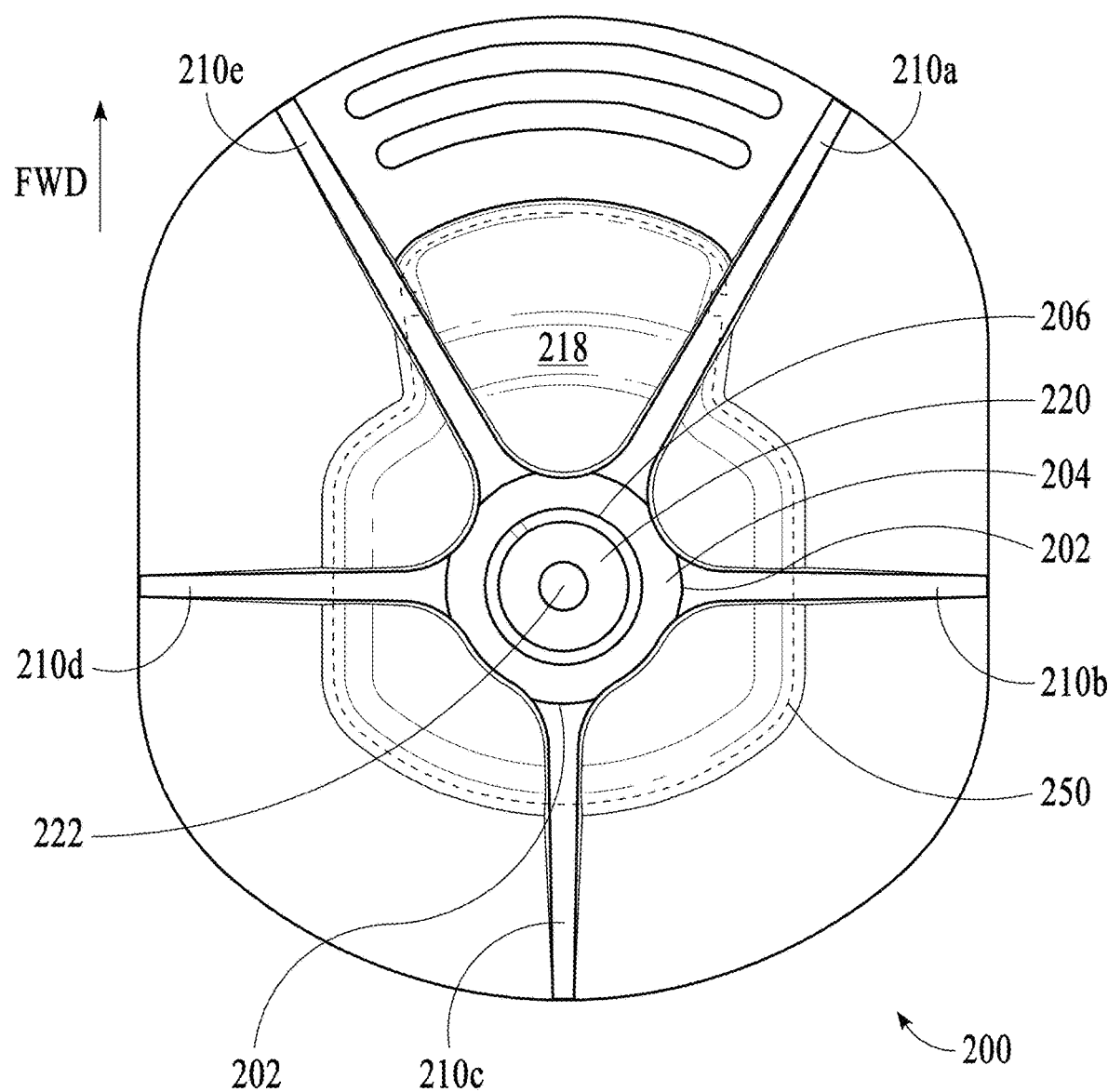
Figure 2C:
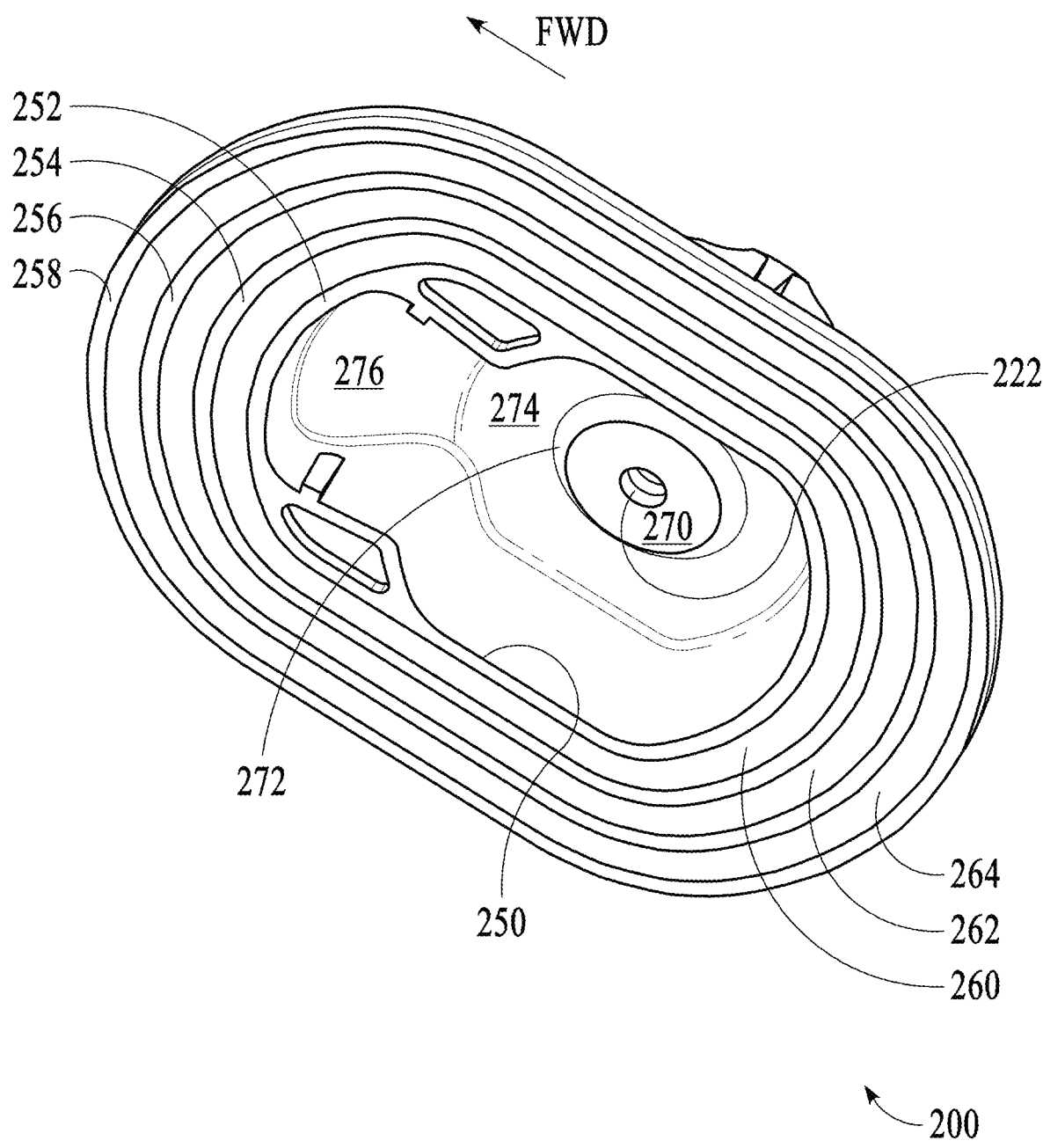
FIGS. 2C and 2D illustrate isometric and orthogonal bottom views of the enclosure, in accordance with some embodiments.
Figure 2D:
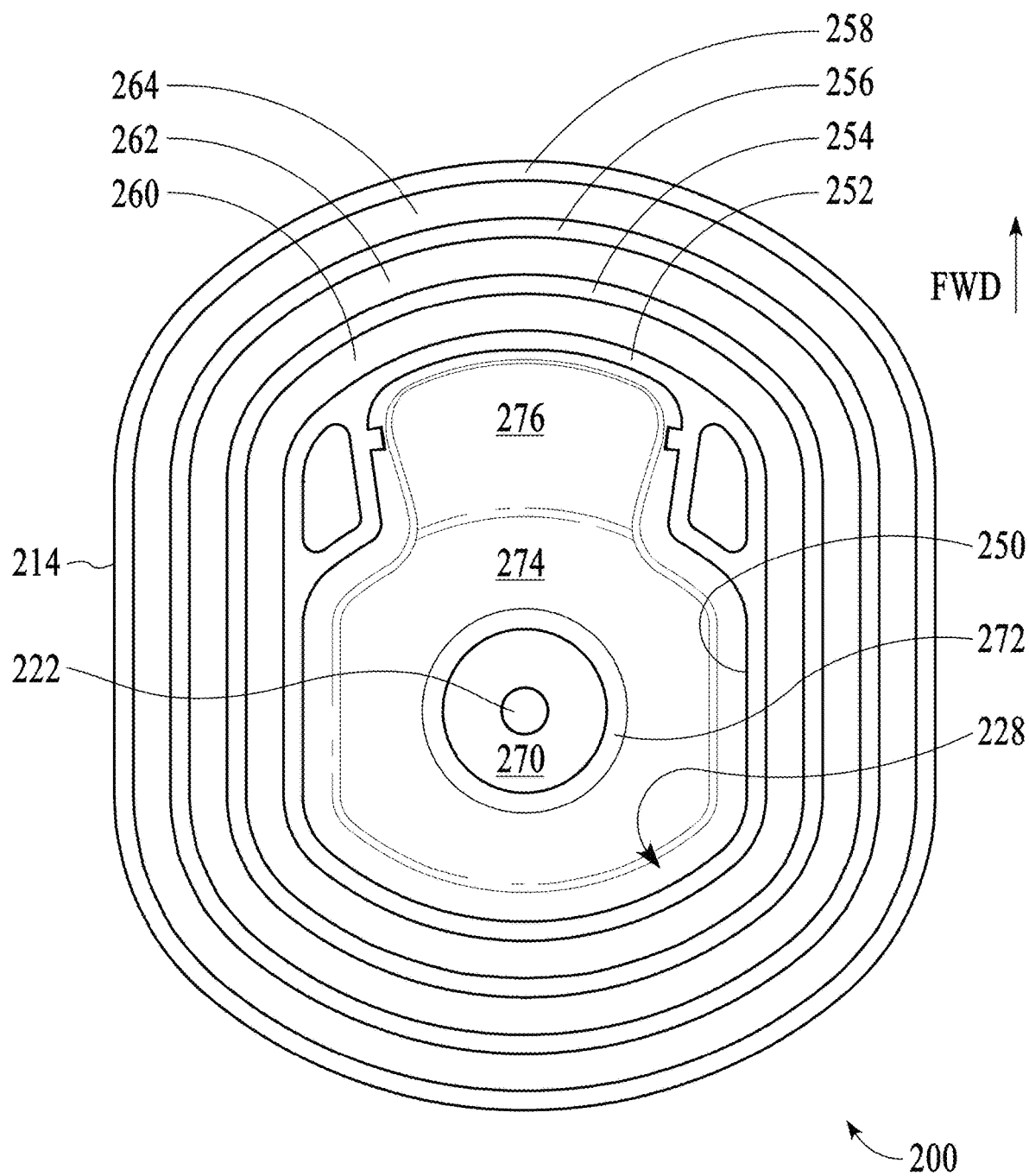
Figure 2E:
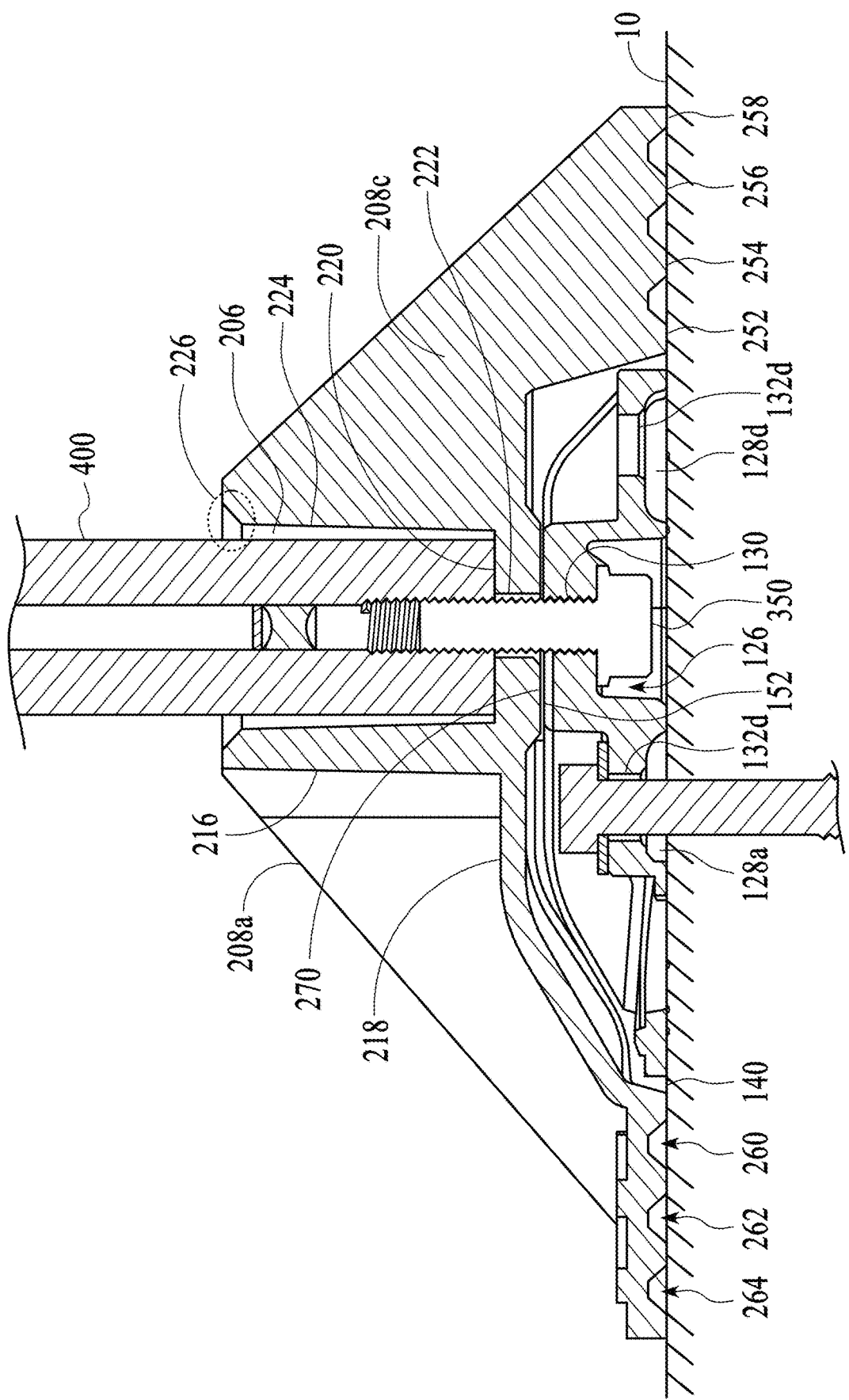
FIG. 2E illustrates a cross-sectional view of the mount assembly mounted on the installation surface, in accordance with some embodiments.

FIGS. 2A and 2B illustrate isometric and orthogonal top views of enclosure 200, respectively; FIGS. 2C and 2D illustrate isometric and orthogonal bottom views of enclosure 200; and FIG. 2E illustrates a cross-sectional view of mount assembly 100 mounted to installation surface 10. Enclosure 200 includes a chamber 250 and horizontal lower member 214 extending outwardly from the perimeter at the bottom of chamber 250. Enclosure 200 includes a vertical post support 216 extending upwardly from an outer surface 218 of chamber 250 until reaching a distal end 202 having an upper surface 204. A plurality of arms 208a through 208e, inclusive, extend outwardly from an outer surface of vertical post support 216, where each have upper surfaces 210a through 210e, respectively, extending downwardly from upper surface 204 until reaching an upper surface 212 of horizontal lower member 214.

Vertical post support 216 forms a post aperture 206 for receiving post 400 when mounting enclosure 200 to installation surface 10 once base 110 has been mounted to installation surface 10. Post aperture 206 includes an inner surface 224 extending upwardly from portion 220 of outer surface 218 of chamber 250 until reaching a lip 226 at upper surface 204. In some embodiments, portion 220 is configured with a flat surface to engage a flat surface of post 400.

Lower surface of horizontal lower member 214 includes outwardly extending parallel walls 252, 254, 256, and 258 forming parallel grooves 260, 262, and 264, as shown, for receiving sealant upon the mounting of enclosure 200 to installation surface 10.

Inner surface of chamber 250 includes a lower portion 270 with an aperture 222 extending to portion 220 of outer surface 218 of chamber 250. Lower portion 270 may be configured or designed with a surface to engage the surface of hub 152 of base 110 when enclosure 200 is mounted to installation surface 10 above base 110. In some embodiments, the surface of lower portion 270 and the surface of hub 152 are flat surfaces.

Distal end 354 of fastener 350 extends upwardly through aperture 222 to engage internal threads of post 400. To mount enclosure 200 to installation surface 10, post 400 engages distal end 354 of aperture 250 and tightened to drive post 400 downward until reaching horizontal inner surface 220 of post aperture 206 and a desired compressive force between post 400 and horizontal inner surface 220 of post aperture 206 and between lower portion 270 of inner surface of chamber 250 and hub 152 of base 110 are reached. Upon installation of enclosure 200, an installer could apply sealant to assist in the prevention of water incursion into chamber 250.

Inner surface of chamber 250 includes a portion 272 extending upwardly from lower portion 270 until reaching an upper portion 274. Also, inner surface of chamber 250 includes a portion 276 extending downwardly from upper portion 274 until reaching wall 252.

Referring now to FIGS. 3A through 3I, there are many fastener configurations that may be employed as illustrated when mounting base 110 to installation surface 10. It should be noted that, although only nine configurations are presented, these are presented for the sole purpose of illustration only; with six apertures 132a through 132f, inclusive, available from which to choose, there are many more alternative fastener configuration(s) and type of fastener(s) from which an installer may choose.

Figure 3C:
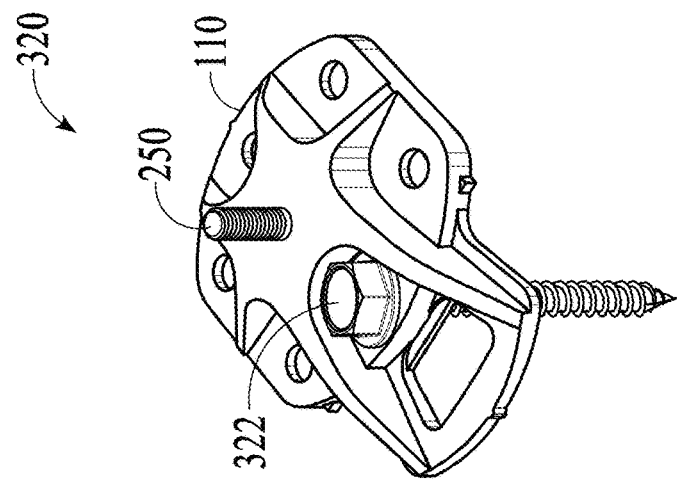
Figure 3B:
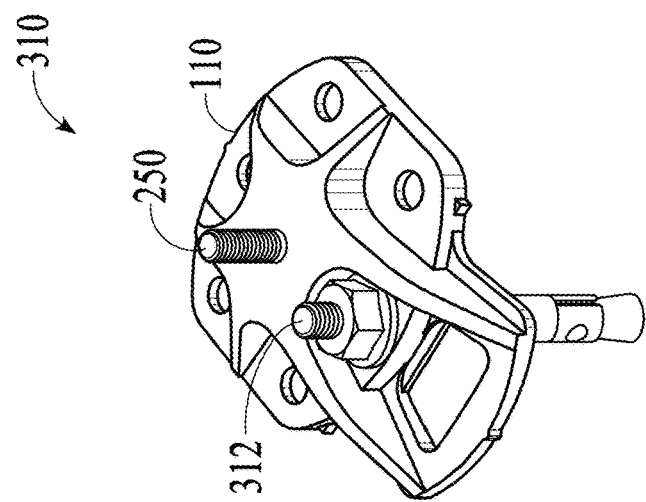
Figure 3A:
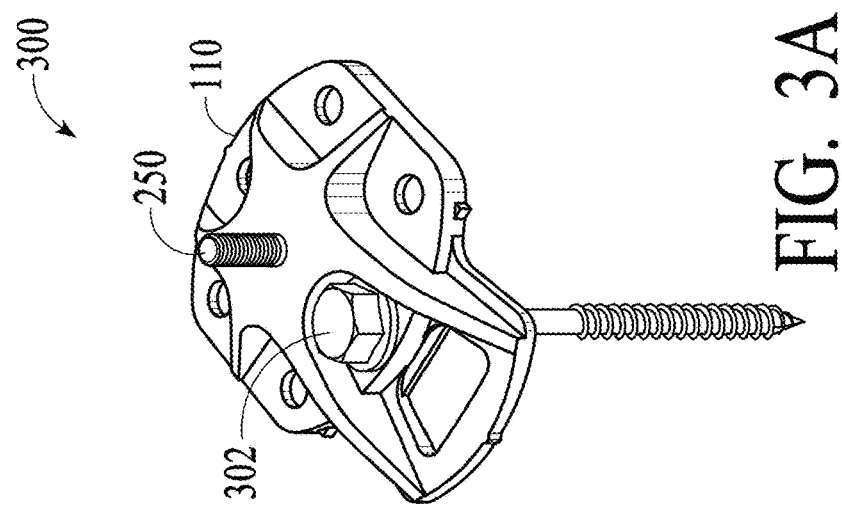

As shown in FIG. 3A, base 110 may mounted to installation surface 10 with a fastener configuration 300 employing including one 5-16 inch lag screw 302 in aperture 132a.

As shown in FIG. 3B, base 110 may mounted to installation surface 10 with a fastener configuration 310 employing one ⅜ inch concrete anchor 312 in aperture 132a.

As shown in FIG. 3C, base 110 may mounted to installation surface 10 with a fastener configuration 320 employing one 5/16 inch concrete screw 322 in aperture 132a.

As shown in FIG. 3D, base 110 may mounted to installation surface 10 with a fastener configuration 330 employing two ¼ inch concrete screws 332a and 332b in respective apertures 132c and 132f.

As shown in FIG. 3E, base 110 may mounted to installation surface 10 with a fastener configuration 340 employing two ¼ inch concrete anchors 342a and 342b in respective apertures 132b and 132e.

As shown in FIG. 3F, base 110 may mounted to installation surface 10 with a fastener configuration 390 employing two ¼ inch lag screws 392a and 392b in respective apertures 132a and 132d.

Figures 3G, 3H, 3I:
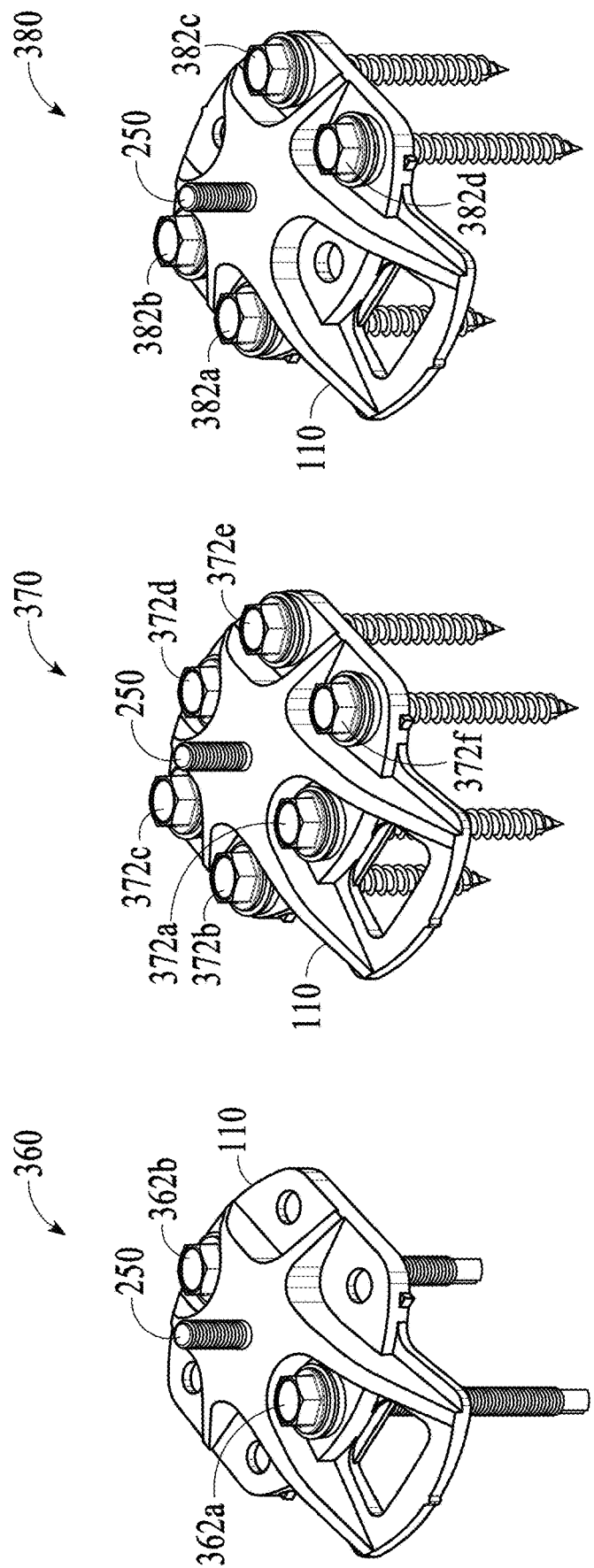

As shown in FIG. 3G, base 110 may mounted to installation surface 10 with a fastener configuration 360 employing two ¼ inch metal screws 362a and 362b in respective apertures 132a and 132d.

As shown in FIG. 3H, base 110 may mounted to installation surface 10 with a fastener configuration 370 employing six ¼ inch wood screws 372a through 372f, inclusive, in respective apertures 132a through 132f, inclusive.

As shown in FIG. 3I, base 110 may mounted to installation surface 10 with a fastener configuration 380 employing four ¼ inch wood screws 382a, 382b, 382c, and 382d in respective apertures 132b, 132c, 132e, and 132f.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A surface mount, comprising:
a base comprised of a lower member and an upper member, where
the lower member is comprised of:
a first aperture extending from a bottom surface of the lower member to an upper surface of a hub of the upper member, where
the first aperture is configured to receive a fastener extending upwardly from the bottom surface and through the first aperture,
a plurality of second apertures encompassing the first aperture, where
each one of the second apertures extends between an upper surface of the lower member and the bottom surface, and
a brace extending outwardly from one side of the lower member, and
the upper member is comprised of:
the hub to which the first aperture extends, and
a plurality of first arms and a plurality of second arms, where
each one of the plurality of first arms extends outwardly from the hub to an upper surface of the brace, and
each one of the plurality of second arms extends outwardly from the hub to the upper surface of the lower member.

2. The surface mount of claim 1, wherein the fastener and the first aperture are threaded.

3. The surface mount of claim 1, wherein the fastener is a flush fastener pressed against the bottom surface when the base is mounted to an installation surface.

4. The surface mount of claim 1, wherein the bottom surface includes a cavity at the first aperture configured to receive the fastener prior to being received by the first aperture.

5. The surface mount of claim 1, wherein a distal end of the fastener is configured to engage a post received by a post aperture of a surface mount enclosure after extending upwardly through both the first aperture and a chamber aperture of the surface mount enclosure.

6. The surface mount of claim 5, wherein the engagement of the distal end of the fastener to the post facilitates a mounting of the surface mount enclosure to an installation surface when the base is mounted to the installation surface.

7. A surface mount enclosure, comprising:
a chamber comprised of a perimeter, an inner surface, an outer surface, and a chamber aperture extending between the inner and outer surfaces;
a post support extending upwardly from the chamber and forming a post aperture; and
a horizontal member extending horizontally and outwardly from the perimeter, where
the chamber aperture is configured to receive a distal end of a fastener extending upwardly from the inner surface and through the outer surface,
the post aperture is configured to receive a post configured to engage the distal end of the fastener, and
the horizontal member includes a plurality of grooves parallel to each other, where
the fastener couples a base to the surface mount enclosure, and
the fastener is a flush fastener pressed against a bottom surface of the base when the base is mounted to an installation surface.

8. The surface mount enclosure of claim 7, wherein the plurality of grooves is configured to receive sealant prior to the surface mount enclosure being mounted to the installation surface.

9. The surface mount enclosure of claim 7, wherein the fastener and the post are threaded.

10. The surface mount enclosure of claim 7, wherein a hub of an upper surface of the base engages a lower portion of the inner surface of the chamber when the base is coupled to the surface mount enclosure.

11. The surface mount enclosure of claim 7, wherein the distal end of the fastener extends upwardly through an aperture of the base prior to being received by the chamber aperture and prior to the base being coupled to the surface mount enclosure.

12. A surface mount assembly, comprising:
a fastener and a post;
a surface mount comprised of:
a base comprised of a lower member and an upper member, where
the lower member is comprised of:
a base aperture extending from a bottom surface of the lower member to an upper surface of a hub of the upper member and configured to receive the fastener;
a surface mount enclosure comprised of:
a chamber comprised of a perimeter, an inner surface, an outer surface, and a chamber aperture extending from the inner surface to the outer surface and configured to receive the fastener; and
a post aperture configured to receive the post, where
the fastener is received by the base aperture prior to the base being mounted to an installation surface,
the fastener is received by the chamber aperture and the post aperture after the base is mounted to the installation surface.

13. The surface mount assembly of claim 12, wherein the post aperture is formed from a post support extending upwardly from the chamber.

14. The surface mount assembly of claim 12, wherein the fastener is a flush fastener pressed against the bottom surface when the base is mounted to the installation surface.

* * * * *